United States Patent [19]

Goddard et al.

[11] 4,397,909
[45] Aug. 9, 1983

[54] PRODUCTION OF SHEET MATERIAL

[75] Inventors: Vaughan P. Goddard, Rondebosch; Richard B. C. Le Maitre, Somerset West, both of South Africa

[73] Assignee: AECI Limited, Johannesburg, South Africa

[21] Appl. No.: 269,127

[22] Filed: Jun. 1, 1981

[30] Foreign Application Priority Data

Jun. 11, 1980 [ZA] South Africa .................. 80/3481

[51] Int. Cl.³ ...................... B32B 27/12; B32B 31/12
[52] U.S. Cl. .................................. 428/252; 156/322; 156/324; 264/137; 427/316; 427/412; 427/434.2; 428/262; 428/264; 428/265; 428/442; 428/520
[58] Field of Search ............... 156/322, 324; 427/314, 427/412, 434.2, 316; 428/246, 252, 260, 262, 264, 265, 442, 520; 264/136, 137

[56] References Cited

U.S. PATENT DOCUMENTS

| | | |
|---|---|---|
| 2,186,183 | 1/1940 | Trumbull . |
| 3,562,043 | 2/1971 | Eddy .................................. 156/79 |
| 3,632,383 | 1/1972 | Dominick et al. ............... 427/316 X |
| 3,740,298 | 6/1973 | Swindells ............................ 156/553 |
| 3,809,534 | 5/1974 | Palmer ......................... 427/434.2 X |
| 4,332,842 | 6/1982 | Litchield et al. ............... 427/316 X |
| 4,341,822 | 7/1982 | Singer et al. .................... 427/316 X |

FOREIGN PATENT DOCUMENTS

| | | |
|---|---|---|
| 997632 | 9/1976 | Canada . |
| 1406703 | 6/1965 | France . |
| 281403 | 3/1952 | Switzerland . |
| 809290 | 2/1959 | United Kingdom . |
| 1026753 | 4/1966 | United Kingdom . |
| 1532621 | 11/1978 | United Kingdom . |

Primary Examiner—Robert A. Dawson
Attorney, Agent, or Firm—Cushman, Darby & Cushman

[57] ABSTRACT

A method of producing sheet material comprises heating a web 10 of closely woven fabric to a temperature of at least 50° C., and preferably to about 150° C., and then impregnating the hot fabric with polyvinylchloride (PVC) paste containing a bonding agent, thereby to provide a material in which the fabric is coated with PVC on each side thereof. Impregnation takes place in a bath 14 with pinch rollers 16 through which the web passes. The pinch rollers 16 squeeze surplus PVC from the web and enhance impregnation. Thereafter the coating can be built up to the desired thickness by dip-coating (in a bath 18) or by a lamination process, whereafter the coated web is cooled in cooling rollers 34 and wound up by a wind-up device 36.

11 Claims, 2 Drawing Figures

PRODUCTION OF SHEET MATERIAL

BACKGROUND OF THE INVENTION

THIS INVENTION relates to a method of producing sheet material comprising a substrate coated with polyvinychloride on each side.

SUMMARY OF THE INVENTION

According to the invention there is provided a method of producing sheet material, which method comprises heating a web of woven fabric to a temperature of at least 50° C., and impregnating the hot fabric with polyvinylchloride paste, thereby to provide a material in which the fabric is coated with polyvinylchloride on each side thereof.

The fabric can be of any suitable synthetic fibre, such as a polyamide, a polyester, polypropylene, or spun glass, or it can be of any suitable natural fibre, such as cotton.

The fabric is preferably heated to a temperature of at least 120° C. but not more than 200° C. The best temperature will depend on the type of fabric used. At the lower end of the temperature range it is more difficult to cause the polyvinylchloride to penetrate the pores of the fabric. At the upper end of the range there is a danger of the paste becoming viscous due to premature ageing of any bonding agent in the polyvinylchloride.

The fabric is preferably a closely woven fabric, which means that adjacent warp threads lie close to one another and that the weft threads are beaten up so as to touch one another. It could, however, also be of a more open weave, in which case the warp threads are more widely spaced and the weft threads are not beaten up to the same extent.

The polyvinylchloride may include a suitable bonding agent. Such bonding agents are known and commercially available, and are used to improve adhesion between the fabric and the polyvinylchloride.

Said impregnation may comprise passing the hot fabric through a bath of said polyvinylchloride paste and then, with the polyvinylchloride which has become attached thereto, through pinching means whereby pressure is applied to the fabric and surplus polyvinylchloride is squeezed therefrom.

The pinching means preferably is in the form of a pair of opposed pinch rollers. The pinching means could, however, also be in the form of a pair of curved blades.

The pinch rollers may be urged together by a force of at least 200 kg/m length of the rollers. The higher the pressure the more polyvinylchloride will be squeezed from the fabric, which is desirable. Preferably the pinch rollers are urged together by a force of about 2000 kg/m length of the rollers.

After said impregnation, the layer of polyvinylchloride on each side of the fabric may be built up to the desired thickness. This may take place by dip-coating, or it may take place by laminating a pre-formed film of polyvinylchloride with the impregnated web. No bonding agent is required for the polyvinylchloride used to build up the thickness of the layers.

The polyvinylchloride can be in the form of a plastisol, that is, without a solvent, or an organosol, that is, with a solvent.

The invention extends to sheet material when made according to the method described above.

BRIEF DESCRIPTION OF THE DRAWINGS

The invention will now be described in more detail, by way of example, with reference to the accompanying diagrammatic drawings.

In the drawings.

DETAILED DESCRIPTION OF PREFERRED EMBODIMENTS

Figure 1:
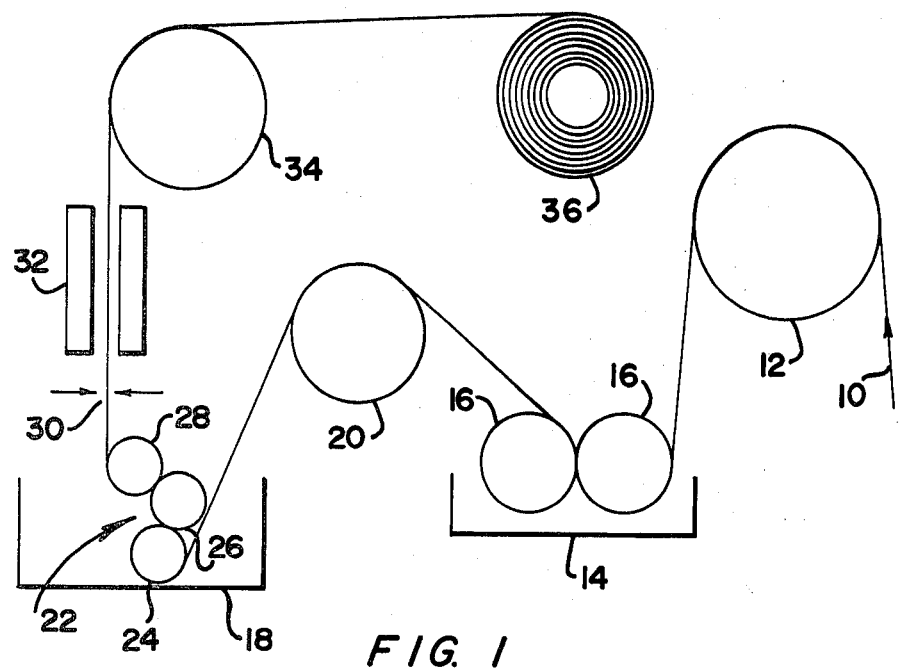
FIG. 1 illustrates apparatus for producing sheet material in accordance with one embodiment of the invention.

In the apparatus of FIG. 1, a web 10 of closely woven fabric is fed over a heated roller 12 and from the roller 12 to a bath 14 in which two applicator or pinch rollers 16 are mounted. The heated roller 12 raises the temperature of the fabric web to about 150° C. The rollers 16 are urged together by a force of about 2000 kg/m length of the rollers. The bath 14 contains a polyvinylchloride (PVC) paste with a suitable bonding agent. The web 10 passes downwardly into the bath 14 and then upwardly between the rollers 16. The pressure between the rollers enhances impregnation of the fabric and, by the squeezing action of the rollers, limits to a thin film the amount of PVC which is applied to the web. The web can, of course, pass downwardly between the rollers, in which case the paste would be in the nip above the rollers.

There is a dip-coating bath 18 also containing a PVC paste. The PVC paste in the bath 18 does not, however, contain bonding agent. The impregnated fabric web passes from the rollers 16, over an idler roll 20 which can be heated, to the bath 18. In the bath 18 there is a roller coater assembly 22 comprising three rollers 24, 26 and 28. The roller 24 is rotatable about a fixed axis while the rollers 26 and 28 are mounted in such manner that their axes of rotation can move towards and away from one another and towards and away from the roller 24. For example, the ends of the roller shafts can be carried in slots. The web 10 passes under the roller 24, between the rollers 24 and 26, and then between the rollers 26 and 28.

There are thicknesser knives 30 which are set so that the required final coating thickness is obtained.

Radiant heaters are shown at 12, the coated web being passed between these and over another idler roll 34 to a windup device 36. The roller 34 is cooled, for example, by means of chilled water running through it.

The rollers 16 can be replaced by converging, curved blades. Springs or other means can be provided for urging the blades into contact with one another. The web travels into the narrowing gap between the pairs of blades and is eventually squeezed between the blades in much the same manner as the rollers 16 squeeze it.

The pull on the web 10 by the device 36 has the effect of moving the rollers 24, 26 and 28 of the roller coater assembly 22 into firm engagement with one another, thereby to exert a squeezing action on the web.

Figure 2:
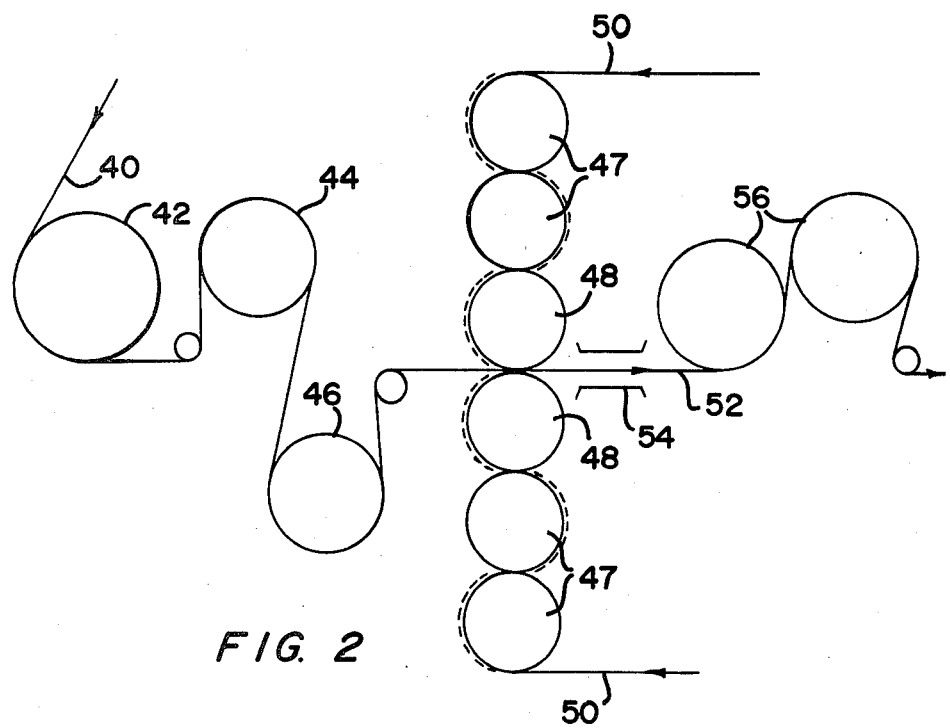
FIG. 2 illustrates part of apparatus for producing sheet material in accordance with another embodiment of the invention.

In the apparatus of FIG. 2 building up of the PVC layers on the impregnated web takes places by a lamination process instead of by dip-coating as in the apparatus of FIG. 1.

An impregnated web 40, produced by a heating roller 12 and pinch rollers 16 as shown in FIG. 1, passes over a series of heating rollers 42, 44, and 46, where its temperature is raised to about 180° C., and from there between two heated laminating rollers 48. Two preformed PVC films 50 are heated by rollers 47 and are also fed between the laminating rollers 48, on opposite sides of the impregnated web 40, where they are laminated with the impregnated web to produce a laminate 52. Upon entering the laminating rollers 48, the temperature of the films 50 is also about 180° C. The laminate may be passed through an oven 54 to consolidate the bond between the films 50 and the web 40. Thereafter the laminate 52 passes over cooling rollers 56 and from there to a wind-up device (not shown) such as that illustrated at 36 in FIG. 1.

We claim:

1. A method of producing sheet material, which method comprises first heating a web of woven fabric, and then impregnating the hot fabric with polyvinylchloride paste thereafter applied to the fabric, thereby to provide a material in which the fabric is coated with polyvinylchloride on each side thereof, the temperature of the hot fabric being at least 50° C. but sufficiently low to permit impregnation of the fabric by the polyvinylchloride paste before any appreciable gelling of the polyvinylchloride paste has taken place, and passing the impregnated fabric through the nip of a pair of opposed pinch rollers whereby pressure is applied to the fabric and surplus polyvinylchloride is squeezed therefrom.

2. A method according to claim 1, wherein the fabric is heated to a temperature of at least 120° C.

3. A method according to claim 1, wherein the fabric is heated to a temperature not exceeding 200° C.

4. A method according to claim 1, wherein the fabric is a closely woven fabric.

5. A method according to claim 1, wherein said impregnation comprises passing the hot fabric through a bath of said polyvinylchloride paste and then, with the polyvinylchloride which has become attached thereto, through said nip, the pinch rollers along urged together by a force of at least 200 kg/m length of the rollers.

6. A method according to claim 5, wherein the pinch rollers are urged together by a force of about 2000 kg/m length of the rollers.

7. A method according to claim 1 wherein, after said impregnation, the layer of polyvinylchloride on each side of the fabric is built up to the desired thickness.

8. A method according to claim 7, wherein said building up takes place by dip-coating.

9. A method according to claim 7, wherein said building up takes place by laminating a pre-formed film of polyvinylchloride with the impregnated web.

10. A method according to claim 1, wherein said impregnation comprises passing the hot fabric through a bath of said polyvinylchloride paste and then, with the polyvinylchloride which has become attached thereto, through said nip; wherein the layer of polyvinylchloride on each side of the fabric is thereafter built up to the desired thickness; wherein the polyvinylchloride in said bath includes a suitable bonding agent; and wherein the polyvinylchloride whereby the layers are built up includes substantially no bonding agent.

11. Sheet material when made according to the method claimed in claim 1.

* * * * *